United States Patent
Zhang (10) Patent No.: US 8,208,643 B2
(45) Date of Patent: Jun. 26, 2012

(54) GENERATING MUSIC THUMBNAILS AND IDENTIFYING RELATED SONG STRUCTURE

(76) Inventor: Tong Zhang, San Jose, CA (US)

( * ) Notice: Subject to any disclaimer, the term of this patent is extended or adjusted under 35 U.S.C. 154(b) by 1369 days.

(21) Appl. No.: 11/772,043

(22) Filed: Jun. 29, 2007

(65) Prior Publication Data

US 2009/0005890 A1    Jan. 1, 2009

(51) Int. Cl.
*H04R 29/00*    (2006.01)
*G06F 17/00*    (2006.01)

(52) U.S. Cl. ............ 381/56; 700/94; 704/500; 704/255; 704/256.8; 704/273

(58) Field of Classification Search ............ 381/56; 704/255, 500, 256.8, 273; 700/94
See application file for complete search history.

(56) References Cited

U.S. PATENT DOCUMENTS

| | | | |
|---|---|---|---|
| 7,179,982 B2 | 2/2007 | Goto | |
| 2001/0003813 A1 | 6/2001 | Sugano et al. | |
| 2003/0083871 A1 | 5/2003 | Foote et al. | |
| 2004/0064209 A1* | 4/2004 | Zhang | 700/94 |
| 2004/0073554 A1 | 4/2004 | Cooper | |
| 2005/0091062 A1 | 4/2005 | Burges et al. | |
| 2006/0080095 A1* | 4/2006 | Pinxteren et al. | 704/233 |
| 2006/0136211 A1* | 6/2006 | Jiang et al. | 704/256.8 |
| 2007/0038448 A1 | 2/2007 | Sherony | |

FOREIGN PATENT DOCUMENTS

| | | |
|---|---|---|
| EP | 0367191 A2 | 5/1990 |
| WO | 01/69575 A1 | 9/2001 |

OTHER PUBLICATIONS

Zhang, T., et al. "Audio Content Analysis for Online Audiovisual Data Segmentation and Classification", IEEE Transactions on Speech and Audio Processing, vol. 9, Issue 4, May 2001 pp. 441-45.
Bartsch M A et al: "Audio Thumbnailing of Popular Music Using Chroma-Based Representations" IEEE Transactions on Multimedia, IEEE Service Center, vol. 7, No. 1,1 Feb. 20, 2005.
Wellhausen J et al: "Audio Thumbnailing Using MPEG-7 Low Level Audio Descriptors" Proceedings of the International Society for Optical Engineering vol. 5242, Sep. 11, 2003.

* cited by examiner

*Primary Examiner* — Vivian Chin
*Assistant Examiner* — Paul Kim (57) ABSTRACT

Provided are, among other things, systems, methods, software programs and techniques for generating an audio thumbnail for a musical piece, in which locations of different repeating segments within an input musical piece are identified. In addition, a singing segment within the musical piece is detected based on a calculated singing metric that indicates when singing is present. A thumbnail criterion that defines a location of an audio thumbnail by reference to generic musical structure is obtained, and a segment of the musical piece is selected as the audio thumbnail based on the thumbnail criterion, together with the location of at least one of the plural different repeating segments and a location of at least a portion of the singing segment. The audio thumbnail is then played and/or stored for future playing.

17 Claims, 6 Drawing Sheets

GENERATING MUSIC THUMBNAILS AND IDENTIFYING RELATED SONG STRUCTURE

FIELD OF THE INVENTION

The present invention pertains to systems, methods and techniques for generating a music thumbnail, i.e., a selected segment of a musical piece that is intended to be representative of the entire musical piece, and for identifying the structure of a musical piece, e.g., for subsequent generation of a music thumbnail.

BACKGROUND

Very few automated techniques for generating music thumbnails exist. One such technique is described in commonly assigned U.S. patent application Ser. No. 10/259,572, filed by the present inventor and titled "System and Method for Generating an Audio Thumbnail of an Audio Track", which application is incorporated by reference herein as though set forth herein in full. However, improvements, particularly in terms of quickly generating music thumbnails that more appropriately represent an entire musical piece, continue to remain desirable.

SUMMARY OF THE INVENTION

The present invention addresses this need by, among other things, providing systems, methods, software programs and techniques for generating an audio thumbnail or for generating a labeled structure for a musical piece (which, e.g., can later be used for generating an audio thumbnail).

Thus, in one representative embodiment, the invention is directed to generating an audio thumbnail for a musical piece, in which locations of different repeating segments within an input musical piece are identified. In addition, a singing segment within the musical piece is detected based on a calculated singing metric that indicates when singing is present. A thumbnail criterion that defines a location of an audio thumbnail by reference to generic musical structure is obtained, and a segment of the musical piece is selected as the audio thumbnail based on the thumbnail criterion, together with the location of at least one of the plural different repeating segments and a location of at least a portion of the singing segment. The audio thumbnail is then played and/or stored for future playing.

In another representative embodiment, the invention is directed to abstracting a musical piece, in which locations of different repeating segments within an input musical piece are identified. In addition, a singing segment within the musical piece is detected based on a calculated singing metric that indicates when singing is present. A labeled structure is then generated for the musical piece based on the location of at least one of the different repeating segments and a location of at least a portion of the singing segment, and the labeled structure for the musical piece is stored.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 1:
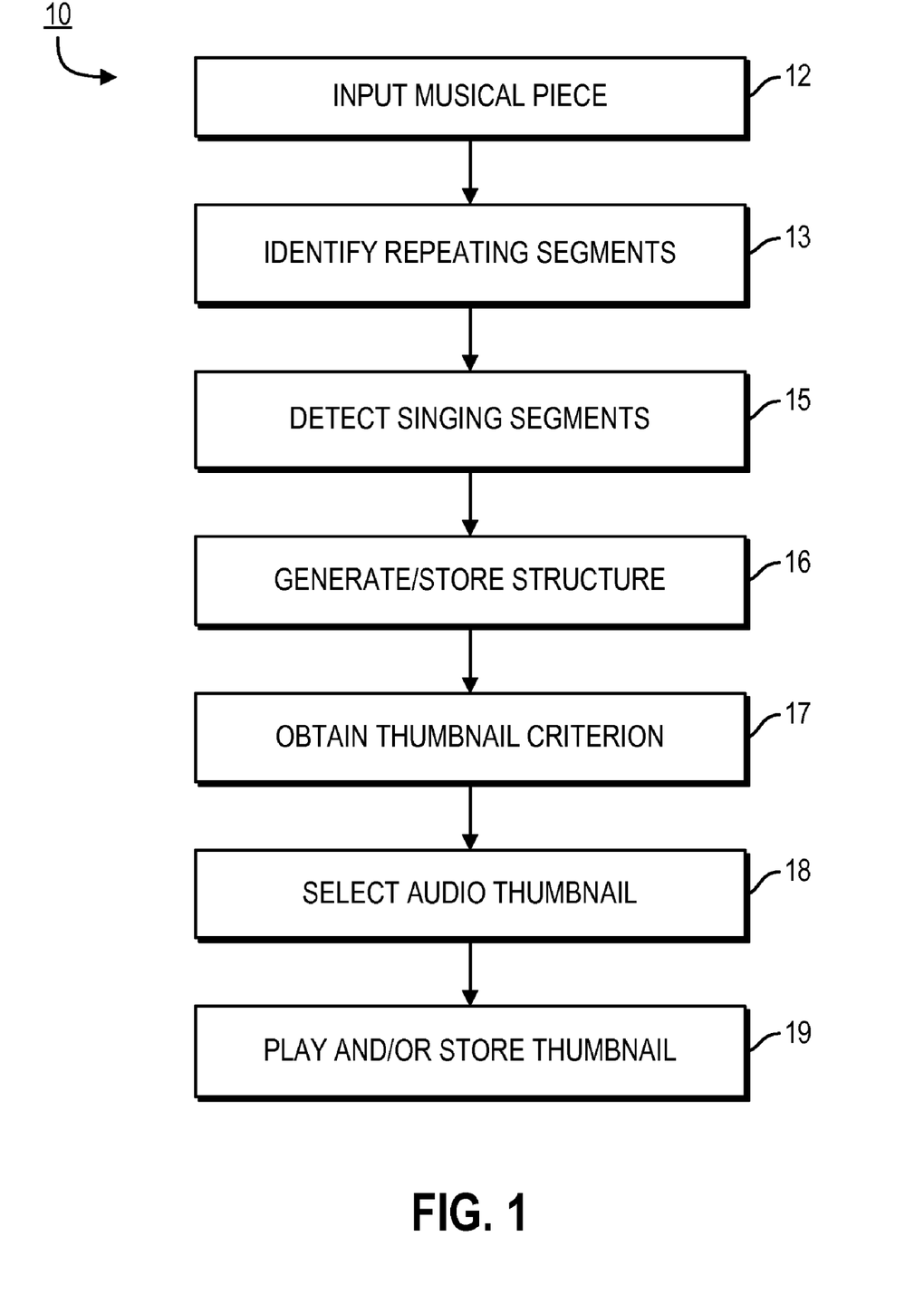
FIG. 1 is a flow diagram illustrating an exemplary process for generating a music thumbnail.

FIG. 1 is a flow diagram illustrating a process 10 for generating a music thumbnail according to a representative embodiment of the present invention. In the preferred embodiments, the entire process 10 is performed automatically in response to a triggering event, so that process 10 can be implemented in software or in any of the other ways described herein.

Initially, in step 12 a musical piece for which a thumbnail is to be generated is input. It is noted that process 10 can be initiated manually by a user, e.g., in the event that the user selects a particular musical piece for which he or she would like to hear a representative sample. Alternatively, process 10 can be performed automatically, e.g., each time a new music file is copied into a particular computer system folder. In general, it is assumed that each input musical piece is represented by a single time-domain audio intensity signal. In the event that a particular musical piece actually includes multiple channels, either a single one of such channels can be used, the different channels can be combined into a single signal, or the individual channels can be processed separately and the results combined.

In the preferred embodiments, the audio processing of an input musical piece includes two main steps: a step 13 of identifying repeating segments and a step 15 of detecting singing segments (segments of the musical piece in which singing is detected as being present). In certain embodiments, steps 13 and 15 are independent of each other and, therefore, can be performed in either order, or can even be performed in parallel. In other embodiments, e.g., where one is only interested in detecting the beginning of singing in a segment that is repeated (such as the beginning as a verse or refrain), the repetition information is used to limit where the process is to search for singing.

In step 13, repeating segments are identified. Preferably, such identification is based on analysis of a frequency-domain metric, and only repeating segments having a specified minimum duration (e.g., at least 12 seconds) are identified. One technique for initially identifying repeating segments is now discussed with primary reference to FIG. 2, although it should be understood that a variety of other techniques instead may be used.

Figure 2:
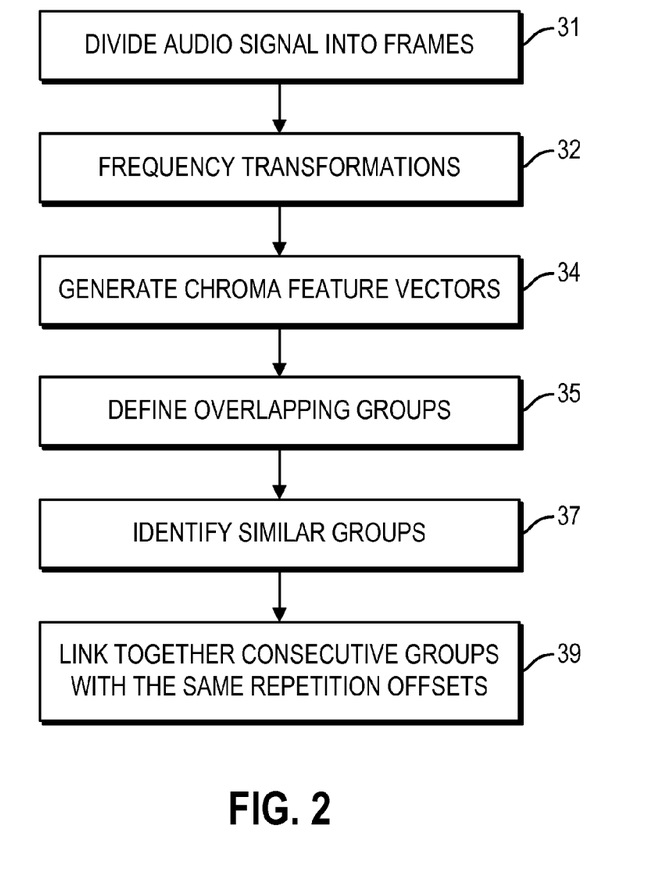
FIG. 2 is a flow diagram illustrating an exemplary process for initially identifying repeating segments within a musical piece.

Initially, in step 31 of FIG. 2, the audio signal for the musical piece is divided into frames. In the preferred embodiment, each frame is 250 milliseconds (ms) long and neighboring frames overlap, e.g., one half of the frame size (i.e., 125 ms in this case).

In step 32, a frequency transformation is performed for each frame. Preferably, the transformation is a Fast Fourier Transform (FFT), although other frequency transformations instead may be used.

In step 34, a "chroma feature vector" is generated for each frame. Preferably, such chroma feature vectors are determined as follows. First, the FFT amplitudes are computed, and then the FFT bins are assigned to the 12 pitch classes using the following frequency-to-note number conversion formula:

$$m = 69 + 12 \log_2(f/440)$$

Seven octaves preferably are chosen, spanning from 33 Hz to 4000 Hz, and a value is determined for each of the 12 pitch classes by summing the amplitudes for the corresponding notes in the different octaves. Accordingly, each frame is represented by a single 12-element chroma feature vector.

In step 35, a sequence of overlapping groups of frames is defined. In the preferred embodiments, each group includes all of the frames within a five-second interval and the groups overlap for ¾ of their lengths, so that the beginning of each group is offset from the beginning of the previous group by 1¼ seconds. However, other durations and/or offsets may be used in alternate embodiments of the invention. The duration preferably is sufficient to allow for meaningful comparisons, and the offset preferably is selected as a trade-off between accuracy and processing speed.

In step 37, similar groups are identified. Generally speaking, in the preferred embodiments each group is compared against each succeeding group, and a maximum of four such succeeding groups are identified (on the assumption that a segment is repeated at most five times in the course of a musical piece). If greater or lesser repetition is expected, such maximum number preferably is adjusted appropriately.

More specifically, the present embodiment identifies similar groups in the following manner. For each group, a temporal curve is generated which represents the Euclidean distance (although other distance measures instead can be used) between this group and all groups after it. That is, the x-axis of the curve represents time and the y-axis represents the distance value. Then, the four lowest minimums in the curve are selected (again, on the assumption that a segment is repeated at most five times in a musical piece), provided that each minimum satisfies certain amplitude and sharpness criteria (discussed below), and further provided that the repeated pairs are at least five seconds from each other. The x-axis value T of each of these minimums, which is the time difference between two groups, is noted.

Figure 3:
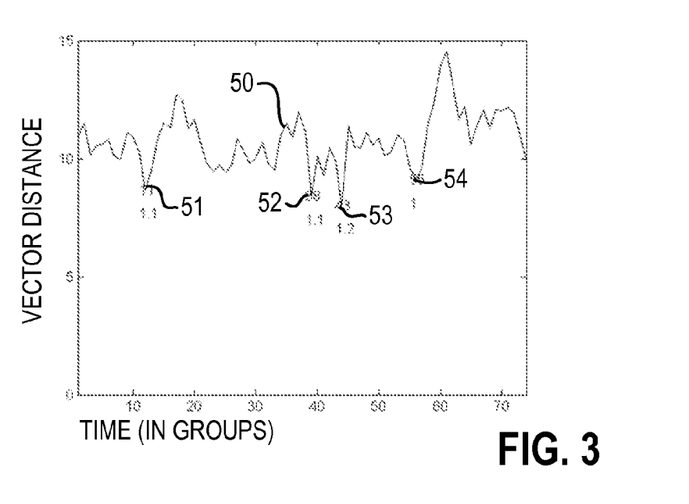
FIG. 3 illustrates an exemplary temporal curve for initially identifying similar or repeating segments within a musical piece.

An example of such a temporal curve 50 is shown in FIG. 3. For each of the four selected minimums 51-54, the location (T=11, 38, 43 and 55 for minimums 51-54, respectively) and sharpness values (1.1, 1.1, 1.2 and 1.0 for minimums 51-54, respectively) are shown. Preferably, the sharpness is computed as follows: sharpness (i)=(d(i−2)+d(i+2)−d(i)*2)/4, where d(i) is the distance value associated with group i, and with the sharpness threshold preferably being a minimum of 0.2 and the amplitude threshold preferably being a maximum of 10. However, it should be noted that other methods for computing sharpness and/or other thresholds instead may be used.

After the minimums satisfying the required criteria have been identified for each group, consecutive groups that share at least one same value of T are linked together. For example, if there are N consecutive groups, starting from group M, ending at group M+N−1, and each of them has an identified minimum in its distance curve with the x-axis value of S (i.e., T=S); then, these N groups are linked together to form one segment. Similarly, the matching segment, also containing N groups, is formed starting from M+S, and ending at M+S+N−1. These two segments together are identified as a pair of repeated segments. As noted above, in the preferred embodiments segments that are shorter than a specified minimum duration preferably are disregarded. In the present embodiment, each segment in such a pair must be at least 12 seconds in duration.

In this way, repeating segments that are a minimum of five seconds in duration are built up in increments of 1¼ seconds. However, as noted above, these values can be adjusted in alternate embodiments.

Figure 4:
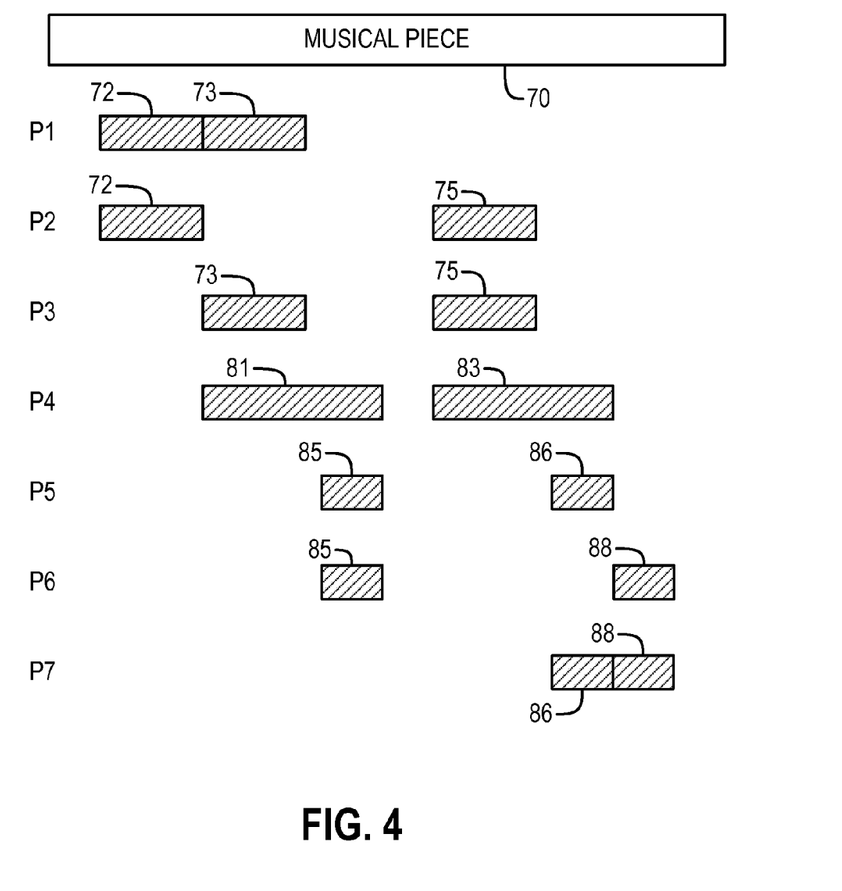
FIG. 4 illustrates an exemplary set of results from a process of initially identifying repeating segment pairs within a musical piece.

An exemplary set of results from the foregoing process is illustrated in FIG. 4. In this example, seven pairs of repeating segments were identified, P1-P7, and each of the identified segments (e.g., segments 72, 73, 75, 81, 83, 85, 86 and 88) indicates the contiguous portion of the musical piece 70 with which it is horizontally aligned. As shown in FIG. 4, segment 72 was paired with segment 73 (P1) and also with segment 75 (P2). Separately, segment 73 was paired with segment 75 (P3). Segment 81 was paired with segment 83 (P4). Segment 85 (which can be seen to be a portion of segment 81) was paired with segment 86 (P5) and with segment 88 (P6) and, similarly, segment 86 was separately paired with segment 88 (P7).

As noted above, the foregoing approach to initially identifying repeating segments is merely exemplary. For example, various sets of heuristic rules may be used to guide the foregoing procedure so that it is robust to minor variations in repeated segments.

Returning to FIG. 1, the preferred approaches for detection of singing segments in step 15 are now discussed. At the outset, it is noted that several different metrics and criteria can be calculated to indicate the presence or absence of singing within a musical piece. The preferred singing metrics are described as follows.

One class of metrics that can be usefully employed to indicate singing looks at the number or rate of zero crossings made by an audio signal. The rate at which zero crossings occur can be interpreted as a simple measure of the frequency content of a signal. In particular, the short-time average zero-crossing rate (ZCR) is defined herein as:

$$Z_n = \frac{1}{2} \sum_m |\text{sgn}[x(m)] - \text{sgn}[x(m-1)]| w(n-m), \text{ where}$$

$$\text{sgn}[x(m)] = \begin{cases} 1 & x(m) \geq 0 \\ -1 & x(m) < 0 \end{cases} \text{ and } w(m) = \begin{cases} 1 & 0 \leq m \leq N-1 \\ 0 & \text{otherwise.} \end{cases}$$

In words, the ZCR is a count of the number of zero crossings over a sliding window that includes the previous N samples (where N preferably is selected so as to correspond to a time interval of 25 ms, i.e., N=sample rate*25 ms). Because unvoiced components in the singing voice typically have higher frequencies, and thus higher ZCR, while voiced components typically have lower frequencies, and thus lower ZCR, there usually are sharp peaks in the ZCR curve during the vocal portions of a musical piece.

Consistent with ordinary usage in the art, as used herein, a "voiced sound" is one in which the vocal cords vibrate, and a voiceless sound is one in which they do not. For example, in the English language a "ssss" sound is unvoiced while a "zzzz" sound is voiced. In English, vowels are almost always voiced and, as indicated in the preceding example, consonants can be voiced or unvoiced.

During the purely musical sections when no singing is present, the ZCR values usually are within a relatively small range, while in the vocal portions, the dynamic range of the ZCR is much larger, with sharp and high peaks. In the preferred embodiments, singing segments are indicated by peaks in the ZCR curve that satisfy certain criteria. More preferably, peaks in the ZCR curve are first located. The left bottom and the right bottom of each peak are identified. Then, the amplitude at the peak, the length of the left arm and the length of the right arm are compared with predetermined thresholds. If each value is above its corresponding threshold, the peak is deemed a "significant peak". In the preferred embodiments, the threshold for the peak amplitude is 80, and the threshold for the length of the left arm and for the length of the right arm is 60.

Figure 5:
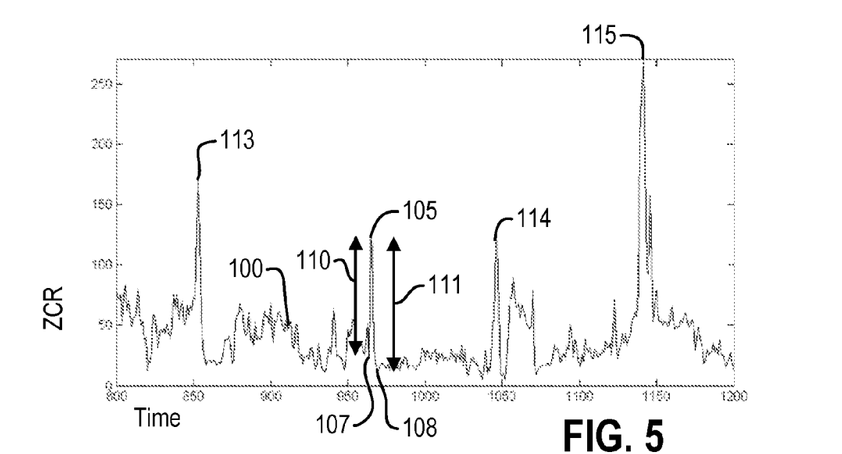
FIG. 5 illustrates an exemplary short-time average zero-crossing rate curve.

An example of a ZCR curve 100 is illustrated in FIG. 5. Here, a peak 105 has a left foot 107 and a right foot 108, as well as a corresponding left arm 110 (which extends from left foot 107 to peak 105) and right arm 111 (which extends from right foot 108 to peak 105). Because the ZCR for peak 105 is greater than 80 and the lengths of the left arm 110 and right arm 111 are both greater than 60, peak 105 is deemed a significant peak in the present embodiment. Also shown in FIG. 5 are additional significant peaks 113-115.

Sections without any significant peak and whose dynamic range is smaller than a threshold are assumed to be without vocal. The start of singing voice (especially after a non-repeating segment, e.g., a prelude or interlude segment), preferably is detected by finding the first significant peak whose "outstanding ratio" (defined as the ratio between the peak amplitude and the sum of the mean and the variance of its 100 previous ZCR values) is higher than a specified threshold (e.g., 2.0). In certain sub-embodiments, if the foregoing criterion is not satisfied but a second criterion is satisfied, then the peak nevertheless is determined to be the start of singing. In one such embodiment, the second criterion is that the outstanding ratio is higher than 1.5, the peak amplitude is higher than 100, and both the left arm and the right arm are longer than 80.

In still further embodiments, the sharpness of a peak may also (or instead) be computed and included into the criteria for defining a significant peak and/or for determining the start of singing. In such a case, the sharpness preferably is defined in a similar manner to the sharpness metric set forth above and is required to be above a predetermined threshold.

Figure 6:
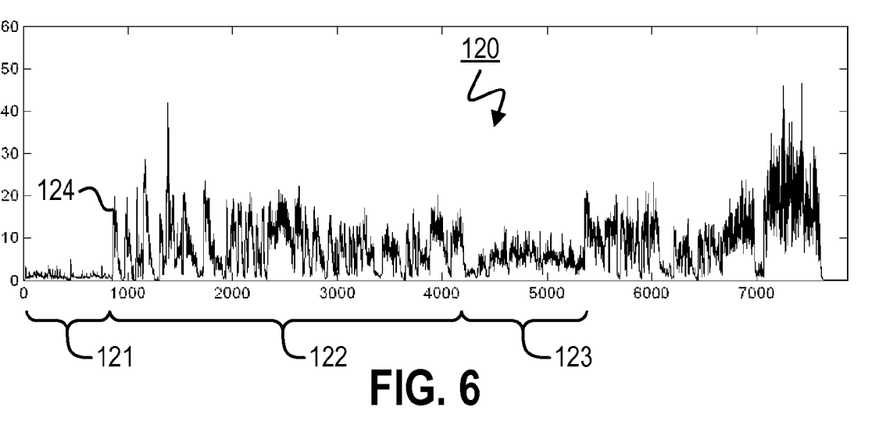
FIG. 6 illustrates an exemplary short-time energy curve.

Another tool for distinguishing singing segments is the short-time energy function, which preferably is defined as follows:

$$E_n = \frac{1}{N} \sum_m [x(m)w(n-m)]^2 \text{ where } w(m) = \begin{cases} 1 & 0 \le m \le N-1 \\ 0 & \text{otherwise,} \end{cases}$$

i.e., the mean signal energy over a sliding window consisting of the previous N samples (where, again, N preferably is selected so as to correspond to a time interval of 25 ms). In vocal sections, sharp peaks and low-level minimums (generated by voiced and unvoiced components, respectively) appear alternately in the energy function curve, while in non-vocal sections, generally there are no high and sharp peaks, or the local minimums are at higher levels continuously. Thus, in the preferred embodiments of the invention, significant peaks are detected and local minimums are checked to locate vocal segments in a musical piece.

The start of singing, e.g., after a prelude or interlude, often results in a sudden rise in the energy curve. Accordingly, after a segment having sharp peaks and low-level minimums is detected, the actual start of singing within that segment preferably is detected by finding such a sudden rise in the energy curve.

For detecting sharp peaks, a similar method as discussed above for detecting significant peaks in the ZCR curve preferably is used. That is, the peak amplitude, the length of the left arm, the length of the right arm and the sharpness are compared with predetermined thresholds. The threshold for the peak amplitude preferably is an adaptive one based on the mean and variance of the energy over the whole musical piece. For example, in one embodiment the threshold is set as: mean+std*c, where c can be 2 or 3. The thresholds for the arm lengths and the sharpness preferably are the same as for the ZCR curve, as described above.

For detecting low-level minimums, adaptive thresholds preferably are determined based on the mean and variance of the energy curve of the local segment of the musical piece. Such adaptive thresholds preferably are determined based on global and local mean and variance values of the energy curve. Preferably, an adaptive threshold is first determined based on global mean and variance, e.g., mean−std*c, where c=2, and segments with no samples lower than the threshold are labeled as non-vocal. Preferably, for the rest of the song, for each segment within a sliding window (e.g., 2-5 seconds long), a threshold is computed based on local mean and variance, and samples in the segment are checked against this threshold; the amplitudes of minimums are compared with the thresholds, and if one is lower than the threshold, it is detected.

Based on the foregoing detections, a vocal segment in the song is identified, e.g., a segment having both sharp peaks and low level minimums. Preferably, the actual start of singing within that segment (e.g., after a prelude or interlude) is identified by detecting a sudden rise in the energy curve based on global and/or local mean and variance values of the energy curve. More preferably, the mean and standard variation (std) of a local segment (e.g., 5-10 seconds long) are computed, then a threshold t1=mean+std*c is determined, where c is a constant (e.g., c=2 in one embodiment). Next, in the local segment the first point A that is greater than t1 is identified and is designated as the start of singing. Alternatively, the detection may be performed in the $1^{st}$ difference curve of the energy, i.e. if a(i) is the energy curve, then its $1^{st}$ difference is b(i)=a(i+1)−a(i). A confidence score for the detection may also be estimated, the confidence score preferably being the ratio between the maximum values after and before A in the local segment; in such a case, based on the confidence score, a determination preferably is made whether to take the result from a(i) or from b(i).

An example of a short-time energy function curve 120 is shown in FIG. 6. Here, segment 121 is a non-singing prelude, segment 122 includes singing and segment 123 is an interlude. As noted above, the beginning of singing 124 is marked by a sudden increase in energy.

Figure 7:
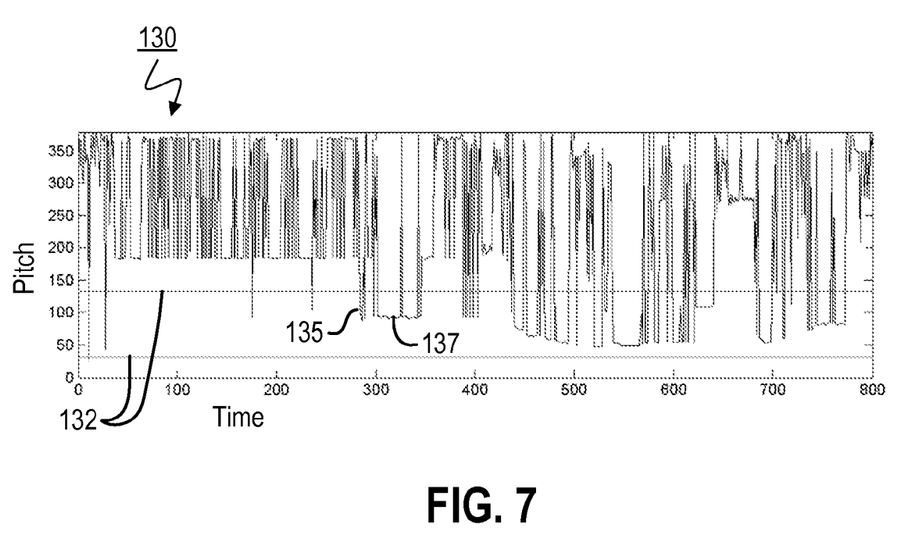
FIG. 7 illustrates an exemplary short-time pitch curve.

A further tool for identifying singing segments is the short-time pitch curve. Generally speaking, pitch corresponds to the fundamental frequency (if any) of an audio signal. In the temporal curve of pitch, harmonic audio signals are characterized by segments of slowly changing pitch values (i.e. with small difference in the amplitude between neighboring points). In contrast, the segments in the pitch curve corresponding to non-harmonic content are very jumpy. Music, which in general is continuously harmonic, typically exhibits a continuously detectable but changing pitch.

In the preferred embodiments, the pitch is estimated by computing the autocorrelation in the time domain and in the spectral domain separately, then summing them with predetermined weights. See, e.g., W. Chou, L. Gu, "Robust singing detection in speech/music discriminator design," Proc. of ICASSP'01, vol. 2, pp. 865-868, Salt Lake City, May 2001. While this approach to pitch calculation has proved to be robust to background noise, other approaches can be used in alternate embodiments, e.g., based on desired trade-offs in terms of accuracy and efficiency.

The pitch curve for instrumental music normally is flatter than that of a voice signal, as the pitch value often has small variations within a singing segment (e.g., vibrations during an individual note), while within many instrumental segments, the pitch is more often consistent. Therefore, the variance of pitch values within the segment preferably is used as a metric to distinguish singing from purely instrumental music.

Moreover, the pitch of a singing voice normally has a range of 120~500 Hz, while the range of pitch for instruments often is wider. Accordingly, in the preferred embodiments, segments in the pitch curve that have slowly changing amplitudes, that have vibrations, and that are within a specified pitch range are detected as indicating the presence of singing.

For detecting slowly changing pitch amplitude, the difference between neighboring pitch values is checked. For a segment of slowly changing pitch, the difference between each pair of neighboring pitches preferably is lower than a specified threshold (e.g., 5), and the length of the segment preferably is longer than a predetermined threshold (e.g., 3 or 4 audio frames).

To detect vibrations, the variance of the pitch values in the segment is computed, and it is compared with a predetermined threshold. Because the fundamental frequency of singing voice typically is in the range of 120 to 500 Hz, then for an audio signal of sampling rate 16000 Hz, the pitch range is 32 to 133. Accordingly, in the preferred embodiments, pitch values in the segment must fall within this range. More preferably, for a segment to be detected as including singing, all three criteria (slowly changing amplitudes, vibrations, and within a specified pitch range) must be satisfied.

An example of a short-time pitch curve 130 for a portion of the song "Yesterday" by the Beatles is illustrated in FIG. 7. Here, the x-axis is time and the y-axis is pitch value. The normal singing range of 120~500 Hz corresponds to the band enclosed by the two horizontal lines 132, and the start of singing 135 is evidence by the fact that the pitch values begin to fall within that range, as well as by the appearance of vibrations 137 in the pitch 130.

Summarizing, metrics used to detect singing in an input musical piece preferably are based on the ZCR, the short-time energy function and the short-time pitch curve. Each of these functions, when calculated, preferably is computed every 20 ms, with a window size of 25 ms. By combining results from these three metrics, it often is possible to obtain more accurate results. For instance, strong percussion instruments may result in high ZCR peaks, which otherwise might be mistakenly detected as a singing voice. However, such non-harmonic sounds do not have the characteristics of voice in the pitch curve.

Because pitch estimation is the most computationally expensive, in the preferred embodiments only the ZCR and the energy function are computed for the entire musical piece. That is, the ZCR and energy features are used first to detect candidate vocal portions in the musical piece. Preferably, any candidate vocal portions detected either through the use of the ZCR or the short-time energy function (e.g., as described above) are combined to create a set of candidate vocal segments. Then, for each candidate vocal segment, the pitch is calculated from the beginning of the segment, until a portion of the segment is found that meets the specified pitch singing criteria (e.g., the three pitch criteria described above). Based on the results from such pitch analysis, the location of the start of singing is adjusted. If no vocal components are detected in the candidate section, then it is labeled as non-vocal.

Returning to FIG. 1, in step 16 structure for the musical piece is generated based on the information derived above and, in certain embodiments, stored for future use. The implementation of this step 16 can be as simple as labeling the different portions of the musical piece based on such information, e.g., where each of the repetition pairs is located and where the singing segment(s) are located. However, in the preferred embodiments, additional processing is performed in this step 16 to refine the structural information that was identified in the preceding steps.

Figure 8:
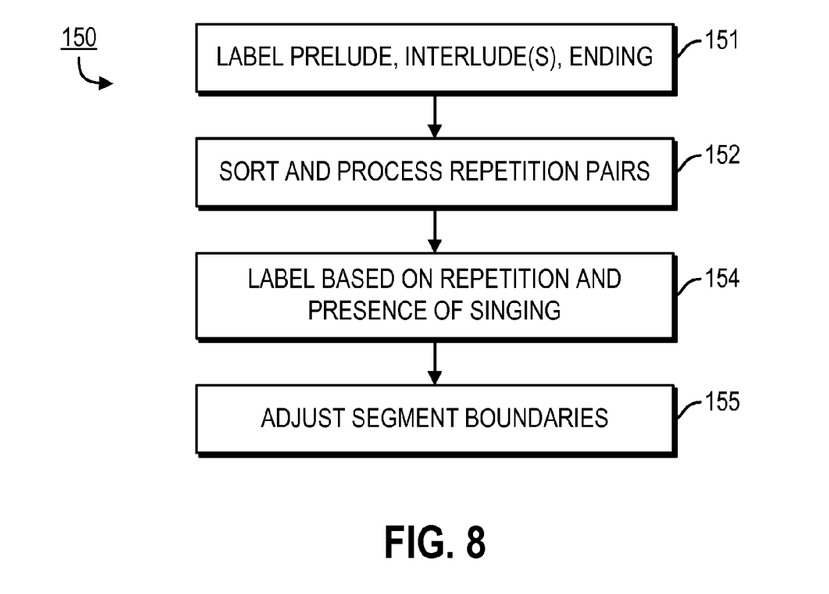
FIG. 8 is a flow diagram showing an exemplary process of refining and labeling structural information for a musical piece.
Figure 9:
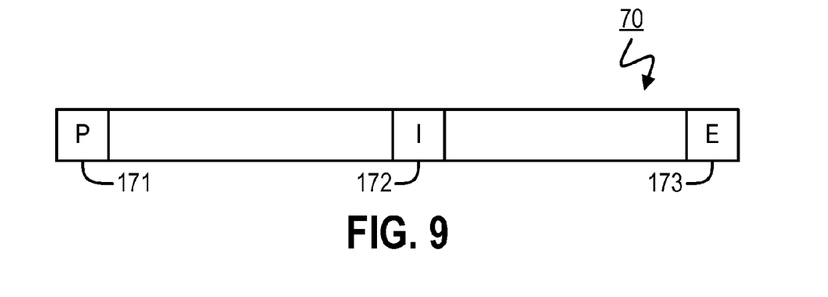
FIG. 9 illustrates the time interval for a musical piece in which the prelude, an interlude and the ending have been labeled.

One exemplary method 150 for performing such processing is now described with reference to FIG. 8. Initially, in step 151 each non-repeating segment of the musical piece is labeled, e.g., as a prelude (if occurring at the beginning), as an interlude (if occurring in the middle) or as an ending. Thus, continuing with the example shown in FIG. 4, the labeled prelude 171, interlude 172 and ending 173 in FIG. 9 correspond to those portions of the musical piece 70 that were not found to exhibit any repetition.

In step 152, the repetition pairs that were identified in step 13 of FIG. 1 are sorted in time order (if necessary) and processed in an attempt to refine the structural information. Generally speaking, such processing preferably involves consolidating and/or dividing any overlapping segments, as appropriate, in accordance with predefined heuristic rules.

As a result of such processing, some overlapping segments might be merged, some might be split, and some might be removed. For example, if there is conflict between two pairs (i.e., only one of them can be valid), then ordinarily in the preferred embodiments the longer one is kept and the shorter one is discarded. On the other hand, if the longer one is too long (e.g., longer than a specified threshold), then the longer one preferably is split. The following are specific examples of heuristic rules that are used in one representative embodiment:

If pair A includes segments A1 and A2, pair B includes segments B1 and B2, A1 overlaps with B1, and A2 does not overlap with B2, then the following rule applies: A1, A2, B2 are labeled as repeated segments if A1 is longer than B1; otherwise, B1, A2, B2 are labeled as repeated segments.

If A1 overlaps with B1, A2 overlaps with B2 and the length of pair A is longer than a specified threshold (e.g. 30 or 40 seconds), then pair A can be split into 2 or 3 pairs. One pair is the same as pair B, and there is a new pair before and/or after B, provided that each pair after the split is longer than a predetermined threshold (e.g., 12 seconds).

Figure 10:
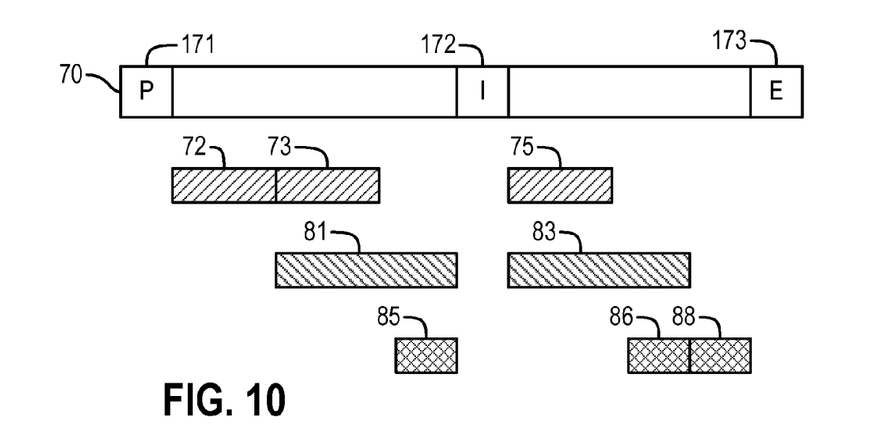
FIG. 10 illustrates an example of the results from combining repetition pairs in accordance with the initial application of certain heuristic rules.

In the example of FIG. 4, the individual repetition pairs already are arranged in time order in FIG. 4, so no additional sorting needs to be performed. FIG. 10 illustrates the results after initially combining the overlapping segments that are entirely coextensive with each other, in accordance with the first bulleted heuristic rule set forth above. As shown in FIG. 10, related pairs simply have been combined into groups that have more than two segments.

Figure 11:
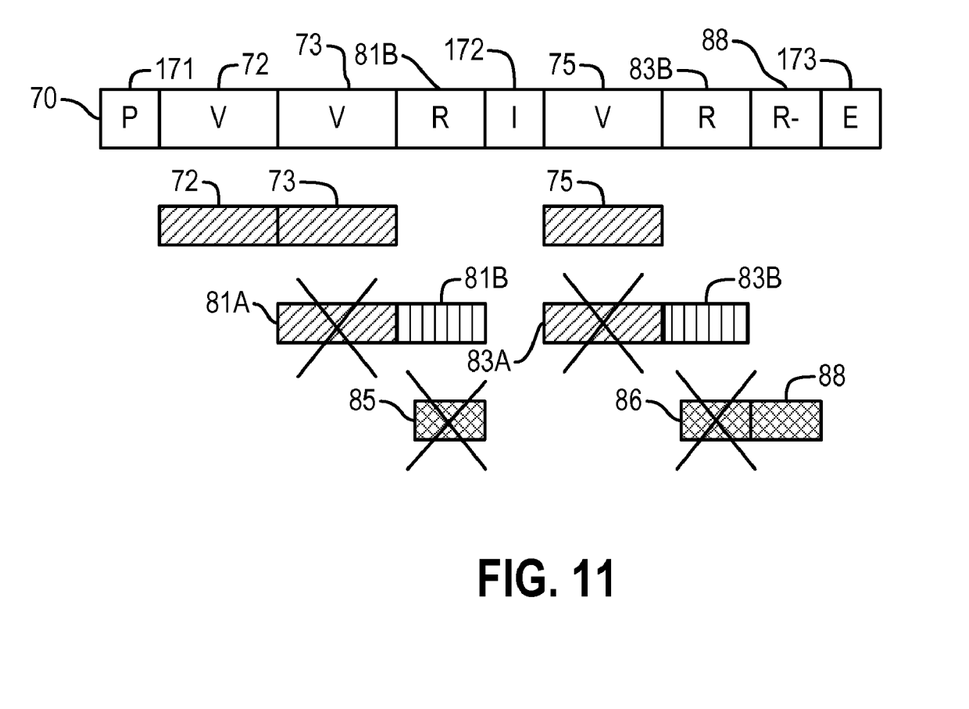
FIG. 11 illustrates an example of the final structure for a musical piece after applying all applicable heuristic rules.

Then, FIG. 11 illustrates the final results after all overlapping segments have been resolved. More specifically, referring to FIG. 11, in accordance with the second bulleted heuristic rule set forth above, segment 81 has been divided into segments 81A and 81B based on its overlap with segment 73 and, similarly, segment 83 has been divided into segments 83A and 83B based on its overlap with segment 75. Because those portions are already covered, segments 81A and 83A are eliminated from further consideration. In addition, segment 81B completely overlaps and is larger than segment 85, so segment 85 is eliminated from further consideration. Similarly, segment 83B completely overlaps and is larger than segment 86, so segment 86 is eliminated from further consideration.

Upon completion of such processing, in step 154 the resulting segments are labeled. In the preferred embodiments, a preliminary structure is identified based on the repetition alone. Then, that preliminary structure is modified, as appropriate, based on the singing information. More preferably, the preliminary structure is generated in a straightforward manner using heuristic rules. For instance, if three repeating segments have been identified in step 152, then all three segments are assigned the same label. If there are two groups of repeating segments and one includes longer segments than the other, the longer of the two preferably are labeled as "verse" while the shorter of the two preferably are labeled "refrain". Alternatively, each segment in one group of repeating segments can be simply labeled as A, each segment in another repeating group as B, and so on.

The singing detection information is then used to modify the preliminary structure, e.g., to make it more precise. For instance, any repeated segment that does not include singing preferably is relabeled as prelude, interlude or ending, as appropriate. In addition, or instead, if part or the whole of a previously labeled prelude, interlude or ending is detected as having singing, in certain embodiments it is labeled as a new type of verse segment (e.g. if there are already verses labeled as A and B, then this segment is labeled as C). Similarly, pure instrumental musical pieces (without singing anywhere in the piece) are distinguished and indexed appropriately (e.g., using the same techniques).

In addition, in step 155 the singing information preferably is used, together with the repetition information, to adjust any mismatches of boundaries between immediately adjacent segments. For instance, if there is a gap between the detected end of the prelude and the detected start of the first verse, further checks of the audio features and repetition pairs preferably are done to adjust their locations so that they meet. In alternate embodiments, an approximate transition point (e.g., to within a second or two) is adequate, and the beginning of the thumbnail is simply set as the earliest point of the transition.

Referring again to the example illustrated in FIG. 11, the end result is that segments 72, 73 and 75 are labeled as versus, segments 81B and 83B are labeled as refrains, and segment 88 is labeled as an abbreviated refrain, in light of the fact that it repeats, to a portion of refrains 81B and 83B. In this example, it is assumed that each of segments 72, 73, 75, 81B, 83B and 88 at least begins with singing. If detected otherwise, then any such segments preferably are relabeled as prelude, interlude or ending, as appropriate.

It is noted that in the present embodiments, the precise ending of a singing segment is not detected, on the assumption that most thumbnail criteria are based only on the beginning of singing (provided that the singing segment is of sufficient duration). For this purpose, an approximate ending, as determined based on the ZCR and short-time energy function singing metrics alone, usually will be adequate. In alternate embodiments, a precise ending of one or more singing segments is found, e.g., using the pitch-based singing metric described above.

Once the final structure for an input musical piece has been identified, such structure can be processed immediately (e.g., to generate one or more audio thumbnails) or can be stored (e.g., for subsequent generation of one or more audio thumbnails).

Returning again to FIG. 1, in step 17 the criterion for identifying an audio thumbnail for the musical piece is obtained. In the preferred embodiments, such criterion is based on melody repetition and/or presence of singing, either directly or indirectly. That is, the user (or an automated system) preferably is able to define the criterion based on either or both of such considerations. More preferably, the thumbnail criterion can be defined as a generic reference to structure labels. For example, the criterion might be defined as the 20 seconds beginning with the start of singing in the musical piece, the entire first segment that is part of a repetition set, or the first occurrence of singing within a segment that is part of a repetition set. Such criterion can be specified individually for each musical piece. However, in the preferred embodiments, one or more default thumbnail definitions are used to generate thumbnails across a wide range of different musical pieces.

In certain embodiments, as discussed above, the detected melody repetition and presence/absence of singing are used in method 10 to automatically generate a labeled structure for the input musical piece. In such embodiments, the audio thumbnail preferably is defined relative to such structure. Moreover, in certain embodiments of the invention, multiple thumbnails are generated for an individual musical piece. Doing so allows the user to listen to a short segment of the musical piece and then, if the piece seems that it might be of interest to the user based on the initial thumbnail, to listen to one or more additional thumbnails to get a better sense of the overall musical piece.

Figure 12:
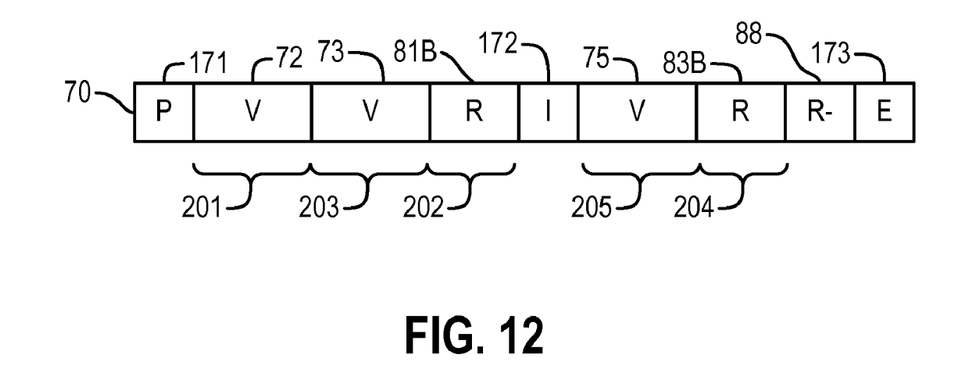
FIG. 12 illustrates the structure for a musical piece and a sequence of audio thumbnails for it.

For example, the first thumbnail might be the first verse of the song; the second thumbnail may be the refrain/chorus that is repeated most times. The length of the thumbnail can be either fixed (e.g., 15 seconds beginning at the start of the first verse) or equal to the length of the segment (e.g., the entire refrain, first occurrence). Illustrated in FIG. 12 is the structure for musical piece 70 and five thumbnails 201-205 for musical piece 70, with thumbnail 201 being played first, 202 being played second, 203 being played third, 204 being played fourth and 205 being played fifth.

It should be noted that the sequence of steps shown in FIG. 1 is merely exemplary. For example, step 17 can be located anywhere within process 10.

In step 18, the audio thumbnail is selected as the segment of the musical piece that corresponds with the criterion obtained in step 17, based on the melody repetition and singing information that has been generated for the musical piece. Implementation of step 18 ordinarily will be straightforward application of such criterion to such information and/or to any other characteristics of the musical piece that are specified in such criterion.

In step 19, the selected thumbnail is played and/or stored for future playing. For example, in one representative embodiment the thumbnail is generated on-the-fly and played immediately. In another, thumbnails are generated for a large collection of musical pieces and stored together with those pieces so that they can be played back whenever desired.

For example, a method for generating audio thumbnails as described above can be incorporated into a larger system for browsing music. One example of such a system is described in U.S. patent application Ser. No. 11/496,999, filed Jul. 31, 2006, titled "Method and System for Browsing Music", which application is incorporated by reference herein as though set forth herein in full. In one example, thumbnails are presented to a user and if the user selects the corresponding musical piece, it is added to the user's playlist. Then, additional thumbnails are presented, either randomly or based on closeness to musical pieces already existing in the user's playlist.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of generating an audio thumbnail for a musical piece, comprising:
   inputting a musical piece;
   identifying locations of plural different repeating segments within the musical piece by identifying initial sets of repeating segments, each initial set including two repeating segments, and then performing, based on specified rules, combining and splitting operations including combining two initial sets that each have one repeating segment overlapping in time into a single set of three repeating segments;
   detecting a singing segment within the musical piece based on a calculated singing metric that indicates when singing is present;
   obtaining a thumbnail criterion that defines a location of an audio thumbnail by reference to generic musical structure;
   selecting a segment of the musical piece as the audio thumbnail based on the thumbnail criterion, together with the location of at least one of the plural different repeating segments and a location of at least a portion of the singing segment; and
   at least one of playing the audio thumbnail and storing the audio thumbnail for future playing.

2. A method according to claim 1, further comprising a step of generating a labeled structure for the musical piece based on the locations of the plural different repeating segments and based on the location of at least a portion of the singing segment.

3. A method according to claim 2, wherein the labeled structure is generated by first creating a preliminary structure using the locations of the plural different repeating segments within the musical piece and then modifying the preliminary structure using the location of at least a portion of the singing segment.

4. A method according to claim 2, wherein the thumbnail criterion defines the location of the audio thumbnail by reference to a label that is identified within the labeled structure.

5. A method according to claim 1, wherein the singing metric comprises at least one of: a first metric pertaining to zero-crossings in, a second metric pertaining to local energy of, and a third metric pertaining to an evaluation of pitch within at least a portion of an audio signal for the musical piece.

6. A method according to claim 1, further comprising a step of selecting a second segment of the musical piece as a second audio thumbnail based on a second thumbnail criterion and at least one of (1) the location of at least one of the plural different repeating segments and (2) a location of at least a portion of at least one of the singing segment and a second singing segment which was detected based on the calculated singing metric.

7. A method according to claim 1, wherein the initial sets of repeating segments are identified by comparing frequency-domain metrics over time.

8. A method according to claim 1, wherein the singing segment is detected based on a metric pertaining to an evaluation of pitch within at least a portion of an audio signal for the musical piece.

9. A method according to claim 8, wherein the metric pertaining to the evaluation of pitch is selectively calculated for portions of the musical piece that have been first identified using a different metric calculation.

10. A method according to claim 1, wherein the locations of the plural different repeating segments within the musical piece are identified based on a criterion pertaining to similarity of melody across segments.

11. A method according to claim 1, wherein the audio thumbnail is selected based on a location where singing begins.

12. A method according to claim 1,
    wherein the performing includes combining the longer of the two overlapping segments into the single set and discarding the shorter of the two overlapping segments.

13. A method according to claim 2, wherein every temporal portion of the musical piece is assigned to a labeled segment of the labeled structure.

14. A non-transitory machine-readable storage medium storing machine-readable process steps for generating an audio thumbnail for a musical piece, said process steps comprising:
    inputting a musical piece;
    identifying locations of plural different repeating segments within the musical piece by identifying initial sets of repeating segments, each initial set including two repeating segments, and then performing, based on specified rules, combining and splitting operations including combining two initial sets that each have one repeating segment overlapping in time into a single set of three repeating segments;
    detecting a singing segment within the musical piece based on a calculated singing metric that indicates when singing is present;
    obtaining a thumbnail criterion that defines a location of an audio thumbnail by reference to generic musical structure;
    selecting a segment of the musical piece as the audio thumbnail based on the thumbnail criterion, together with the location of at least one of the plural different repeating segments and a location of at least a portion of the singing segment; and
    at least one of playing the audio thumbnail and storing the audio thumbnail for future playing.

15. A method of generating an audio thumbnail for a musical piece, comprising:
    inputting a musical piece;
    identifying locations of plural different repeating segments within the musical piece by identifying initial sets of repeating segments, each initial set including at least two repeating segments, and then performing combining and splitting operations with respect to segments in the initial sets based on specified rules;
    detecting a singing segment within the musical piece based on a calculated singing metric that indicates when singing is present;

obtaining a thumbnail criterion that defines a location of an audio thumbnail by reference to generic musical structure;

selecting a segment of the musical piece as the audio thumbnail based on the thumbnail criterion, together with the location of at least one of the plural different repeating segments and a location of at least a portion of the singing segment; and at least one of playing the audio thumbnail and storing the audio thumbnail for future playing, wherein each of the repeating segments of a first initial set is larger than, and completely overlaps, a corresponding repeating segment of a second initial set, and wherein the performing includes discarding each corresponding repeating segment of the second initial set.

16. A method of generating an audio thumbnail for a musical piece, comprising:

inputting a musical piece;

identifying locations of plural different repeating segments within the musical piece by identifying a first initial set A of repeating segments that includes a pair of repeating segments A1 and A2 and a second initial set B of repeating segments that includes a pair of repeating segments B1 and B2, and then performing combining and splitting operations with respect to segments in the initial sets based on specified rules;

detecting a singing segment within the musical piece based on a calculated singing metric that indicates when singing is present;

obtaining a thumbnail criterion that defines a location of an audio thumbnail by reference to generic musical structure;

selecting a segment of the musical piece as the audio thumbnail based on the thumbnail criterion, together with the location of at least one of the plural different repeating segments and a location of at least a portion of the singing segment; and at least one of playing the audio thumbnail and storing the audio thumbnail for future playing, wherein segment A1 overlaps segment B1, segment A2 overlaps segment B2, and set A is longer than a first threshold, and wherein the performing includes splitting the first initial set A into two or three new sets.

17. A method according to claim 16, wherein the splitting is performed if the first initial set A is longer than a first threshold and if each new set is longer than a second threshold.

* * * * *